(12) United States Patent
Fang et al.

(10) Patent No.: US 12,138,594 B2
(45) Date of Patent: Nov. 12, 2024

(54) SYNTHESIS OF POROUS GRAPHITIC CARBON MEMBRANES

(71) Applicants: QATAR FOUNDATION FOR EDUCATION, SCIENCE AND COMMUNITY DEVELOPMENT, Doha (QA); TOTAL E&P GOLFE LTD, Doha (QA)

(72) Inventors: Lei Fang, College Station, TX (US); Sai Che, College Station, TX (US); Chenxu Wang, College Station, TX (US); Mohammed Al-Hashimi, Doha (QA); Sarbajit Banerjee, College Station, TX (US)

(73) Assignees: QATAR FOUNDATION FOR EDUCATION, SCIENCE AND COMMUNITY DEVELOPMENT, Doha (QA); TOTAL E&P GOLFE LTD, Doha (QA)

( * ) Notice: Subject to any disclaimer, the term of this patent is extended or adjusted under 35 U.S.C. 154(b) by 447 days.

(21) Appl. No.: 17/609,515

(22) PCT Filed: May 10, 2020

(86) PCT No.: PCT/QA2020/050006
§ 371 (c)(1),
(2) Date: Nov. 8, 2021

(87) PCT Pub. No.: WO2020/231282
PCT Pub. Date: Nov. 19, 2020

(65) Prior Publication Data
US 2022/0212147 A1    Jul. 7, 2022

Related U.S. Application Data

(60) Provisional application No. 62/846,266, filed on May 10, 2019.

(51) Int. Cl.
*B01D 67/00* (2006.01)
*B01D 71/02* (2006.01)

(52) U.S. Cl.
CPC ...... *B01D 67/0006* (2013.01); *B01D 71/0211* (2022.08)

(58) Field of Classification Search
CPC ........ C08G 61/10; C08G 61/02; C08G 61/12; C08G 2261/11; C08G 2261/12;
(Continued)

(56) References Cited

U.S. PATENT DOCUMENTS 4,036,818 A * 7/1977 Korshak ................ C08G 61/10
528/223
8,598,349 B2   12/2013 Oda et al.
(Continued)

FOREIGN PATENT DOCUMENTS

CN    105949443 A    9/2016
WO    2018132320 A1  7/2018

OTHER PUBLICATIONS

Yasamut, et. al, (A modified Cu(0)—Cu(I)-mediated Caryl-Caryl Ullmann coupling for the synthesis of biaryls, 2016, Tetrahedron 72 (2016) 5994-6000 (Year: 2016).*
(Continued)

*Primary Examiner* — Bradley R Spies
*Assistant Examiner* — Jeannie McDermott
(74) *Attorney, Agent, or Firm* — K&L Gates LLP

(57) ABSTRACT

Methods for preparation of a carbon membrane include providing a solution comprising a diacetyl biphenyl monomer and an alkylsulfonic acid. The solution is treated under such conditions that an aldol condensation reaction occurs so as to produce a porous polymer network. The porous polymer network is treated under such conditions that a Scholl reaction occurs.

17 Claims, 4 Drawing Sheets

(58) Field of Classification Search
CPC ........ C08G 2261/132; C08G 2261/316; C08G 2261/344; C08G 2261/40; C08G 6/00; B01D 15/165; B01D 67/0006; B01D 67/00135; B01D 71/06; B01D 61/027; B01D 61/145; B01D 71/44; B01D 71/0211; B01D 71/021; B01D 67/0044; B01D 67/0058; B01D 2323/081; B01J 20/205; B01J 20/262; B01J 20/28045; B01J 20/28066; B01J 20/28071; B01J 20/3071; B01J 20/3085; C08J 9/286; C08J 2201/04; C08J 2201/0504; C08J 2365/00; C08J 2365/02; C07C 17/269; C07C 25/18; C07C 45/72; C07C 49/76; C07C 49/84; C07C 67/343; C07C 69/76; C07C 41/30; C07C 43/2055; C07C 303/30; C07C 315/04

See application file for complete search history.

(56) References Cited

U.S. PATENT DOCUMENTS

| | | | | |
|---|---|---|---|---|
| 8,779,177 | B1* | 7/2014 | Zhou | C07C 49/683 |
| | | | | 556/400 |
| 10,270,082 | B2 | 4/2019 | Horiguchi et al. | |
| 2014/0212668 | A1* | 7/2014 | Dichtel | C08G 61/02 |
| | | | | 977/734 |
| 2018/0194891 | A1* | 7/2018 | Fang | B01D 15/165 |

OTHER PUBLICATIONS

International Search Report for related International Application No. PCT/QA2020/050006; report dated Nov. 19, 2020; (2 pages).

Written Opinion for related International Application No. PCT/QA2020/050006; report dated Nov. 19, 2020; (7 pages).

Bowden et al., Reactions of carbonyl compounds in basic solutions. Part 26. The mechanisms of the base-catalysed cyclisation of 1,2-diacetylbenzene, 1,8-diacetylnaphthalene, 4,5-diacetylphenanthrene and 2,2'-diacetylbiphenyl, J. Chem. Soc., Perkin Trans., vol. 2, 1997 [retrieved on Sep. 4, 2020). Retrieved from the Internet: <URL: https://pubs.rsc.org/en/contenl/articlehtml/1997/p2/a606399c>. entire document.

Lungerich, Fragments of Graphyrin, 2017 [retrieved on Sep. 4, 2020:WJ. Retrieved from the Internet: <URL: https://opus4.kobv.de/opus4-fau/frontdoor/index/index/docld/8344>. pp. 1-7, 54-60.

Guo, et al; "Cost Effective Synthesis and Solution Processing of Porous Polymer Networks through Methanesulfonic Acid Mediated Aldol Triple Condensation"; Dec. 2017; Materials Chemistry Frontiers; (7 pages).

Johnson; "Cyclodehydrogenationof Arenes(Scholl Reaction)"; Apr. 17, 2013; (34 pages).

Wang, et al; "Synthesis of single-crystal-like nanoporous carbon membranes and their application in overall water splitting"; Jan. 4, 2017; Nature Communications; (9 pages).

Wikipedia; "Scholl Reaction"; https://en.wikipedia.org/wiki/Scholl_reaction; retrieved from Internet Mar. 21, 2019; (3 pages).

Preliminary Report on Patentability for related International Application No. PCT/QA2020/050006; report dated Nov. 25, 2021; (9 pages).

* cited by examiner

SYNTHESIS OF POROUS GRAPHITIC CARBON MEMBRANES

CROSS-REFERENCE TO RELATED APPLICATIONS

The present application is a National Stage filing under 35 U.S.C. 371 of International Application No. PCT/QA2020/050006, filed on May 10, 2020, which claims priority to U.S. Provisional Patent Application No. 62/846,266, filed on May 10, 2019, the entire contents of which are being incorporated herein by reference.

BACKGROUND

Carbon-rich membranes allow for high mechanical strength, high electrical and thermal conductivity, chemical/thermal stability, and intrinsic uniform two-dimensional structure. As such, carbon-rich membranes may be developed for numerous real-life practical applications, including, but not limited to, protective coating and lithium battery.

SUMMARY

According to one non-limiting aspect of the present disclosure, an example embodiment of a method for preparation of a carbon membrane is described. The example method for preparation of a carbon membrane may include providing a solution comprising a diacetyl biphenyl monomer and an alkylsulfonic acid. The solution may be treated under such conditions that an aldol condensation reaction occurs to produce a porous polymer network. The porous polymer network may be treated under such conditions that a Scholl reaction occurs.

In an embodiment, the solution may comprise a plurality of diacetyl biphenyl monomers.

In an embodiment, the alkylsulfonic acid may comprise methanesulfonic acid.

In an embodiment, the aldol condensation reaction may comprise an aldol triple condensation reaction.

In an embodiment, the porous polymer network may comprise a conjugated porous polymer network.

In an embodiment, the diacetyl biphenyl monomer may comprise a 2,2'-diacetyl-1,1'-biphenyl monomer.

In an embodiment, the diacetyl biphenyl monomer may be synthesized by providing a second solution comprising 2'-Iodoacetophenone, copper powder, and CuTc; heating the second solution; and cooling the second solution.

In an embodiment, the second solution may be heated to a temperature below 100° C. under $N_2$.

In an embodiment, the second solution may be heated to a temperature up to 70° C.

In an embodiment, the second solution may be heated for about 24 hours.

In an embodiment, the second solution may then be cooled to room temperature.

In an embodiment, a porous carbon precursor may be synthesized by heating the first solution to a temperature between 100° C. and 200° C.; cooling the first solution; and extracting the porous carbon precursor.

In an embodiment, the first solution may be heated to a temperature up to 150° C. for about 24 hours.

In an embodiment, a porous graphitic carbon may be synthesized by providing a suspension comprising the porous carbon precursor; bubbling the suspension with $N_2$; adding to the suspension a mixture comprising $FeCl_3$ and $MeNO_2$ dropwise; and stirring the suspension.

In an embodiment, the example method for preparation of a carbon membrane may include providing the first solution between two pieces of glass; and heating the two pieces of glass to a temperature between 100° C. and 200° C.

In an embodiment, the two pieces of glass may be heated at about 150° C. for about 24 hours.

Additional features and advantages are described herein, and will be apparent from the following Detailed Description.

BRIEF DESCRIPTION OF THE DRAWINGS

Features and advantages of the method for synthesis and processing of a porous carbon membrane with a graphitic structure described herein may be better understood by reference to the accompanying drawings in which.

Figure 1:
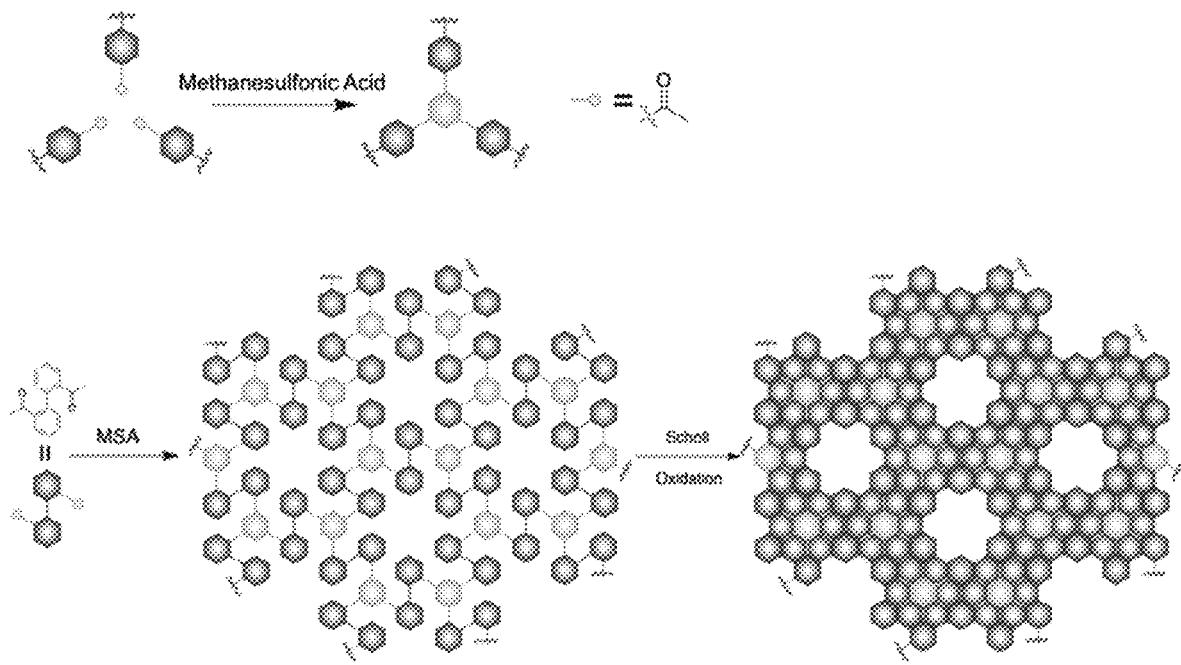
FIG. 1 illustrates the design of the porous graphitic carbon membrane according to an aspect of the present disclosure.

The reader will appreciate the foregoing details, as well as others, upon considering the following detailed description of the method for synthesis and processing of a porous carbon membrane with a graphitic structure according to the present disclosure. The reader may also comprehend certain of such additional details upon using the method for synthesis and processing of a porous carbon membrane with a graphitic structure described herein.

DETAILED DESCRIPTION

Conventional synthesis and fabrication of porous graphene or graphitic carbon membranes, such as block copolymer lithography (BCL), chemical etching, barrier-guided chemical vapor deposition (BG-CVD), surface mediated bottom-up synthesis, and Diels-Alder (DA) coupling-Scholl oxidation have a number of disadvantages. For example, in BCL, a copolymer layer acts as the template, where one component decomposes to yield lithography pattern, followed by further plasma etching to generate pores onto graphene layers underneath. This method may only work on the interface, so that the scalability is severely limited. In chemical etching: acid/oxidizer or base treatment directly generates pores in graphene oxide/reduced graphene oxide. This method may give ill-defined pore sizes and edge structures. In BG-CVD, patterned inert barriers on catalytic metal surface terminate the graphene growth at certain positions, leading to porous graphene structure after washing out barriers. This method may only works on the interface, so that the scalability is severely limited. In surface mediated bottom-up synthesis, some certain lattices of noble metal help to align the specifically designed monomers on the surface. Heat-triggered dehalogenation then dehydrogenation yields desired porous graphene structures. This method may only work on the interface, so that the scalability is severely limited. In DA coupling-Scholl oxidation, highly efficient DA coupling yields porous backbone, where the adjacent rings can be further connected by Scholl oxidation. This method may allow for scalable bulk synthesis of porous carbon, but with only partial graphitic structure. Furthermore, membrane fabrication with this method has not been demonstrated yet. Thus, there has developed a need for processes and systems that overcome the limitations of prior processes for synthesis and fabrication of porous graphene or graphitic carbon membranes.

The present disclosure, in part, is directed to a chemical and engineering method for synthesis and processing of porous carbon membrane with graphitic structure. In some embodiments, the method of the present disclosure includes providing a solution comprising a diacetyl biphenyl monomer and an alkylsulfonic acid. The solution is treated under such conditions that an aldol condensation reaction occurs to produce a porous polymer network.

As used herein, the term "aldol condensation" is used throughout the specification to describe a condensation reaction in organic chemistry in which an enol or an enolate ion reacts with a carbonyl compound to form a β-hydroxyaldehyde or β-hydroxyketone, followed by dehydration to give a conjugated enone. Aldol condensation is an effective reaction to construct carbon-carbon bonds. A tandem aldol triple condensation (ATC) reaction constructs a central benzene ring from aromatic acetyl groups. In the presence of acid, this reaction involves two aldol condensation steps following by a [3+3] electrocyclic reaction and aromatization.

According to certain non-limiting embodiments, the porous polymer network is treated under such conditions that a Scholl reaction occurs. With delicate design of functional group positions and steric hindrance, regulated ordered micropores may be generated after the ATC reaction. In the meantime, closely accommodated aromatic rings may enable the subsequent Scholl oxidation to achieve graphitic backbone. This chemically bottom-up synthesis may ensure precise introduction of well-defined pores into graphene layer in a scalable manner.

According to certain non-limiting embodiments, the alkylsulfonic acid comprises methanesulfonic acid as both catalyst and solvent at the same time for ATC, enabling potential mass production. As used herein, the term "methanesulfonic acid" or "MSA" is used throughout the specification to describe a colorless liquid with the chemical formula $CH_3SO_3H$ and the following structure:

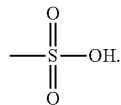

Good monomer solubility in MSA may allow for solution processability of the reaction precursor, followed by in situ reactions to generate the desired porous graphitic structure, enabling solution processability of such insoluble materials into membranes. Furthermore, in some specific embodiments, all materials utilized in the method of the present disclosure are available in large scales at low prices.

It is believed that the porous carbon membrane of the present disclosure may be useful in applications including, but not limited to, electrochemical catalysis and electrical sensing devices. The incorporation of micropores and graphitic constitution into carbon membrane leads to porous graphitic carbon (PGC) membranes. The highly porous structure can not only tune electronic/chemical properties, but also capture small molecules and ions to enable applications for electrochemical catalysis and electrical sensing.

The following sections provide examples of the method of the present disclosure. Although specific approaches are given in the sections below, the approaches provided herein do not encompass all possible options. Rather, the present inventors determined that the approaches given in the sections below represent possible approaches that can produce a suitable embodiment of the porous carbon membrane. It is to be understood that the porous carbon membrane of the present disclosure may be made according to other approaches.

FIG. 1 shows the design of the porous graphitic carbon (PGC) membrane. The present inventors have surprisingly discovered that employing 2,2'-diacetyle-1,1'-biphenyl monomers can yield the desired precursor. It is believed that this diacetyl-functionalized byphenyl monomer has never been applied into making porous polymer networks.

Figure 2:
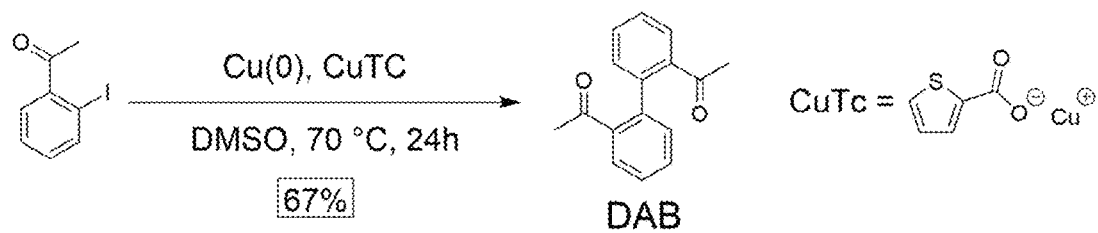
FIG. 2 illustrates the synthesis of 2,2'-diacetylbiphenyl (DAB) according to an aspect of the present disclosure.

FIG. 2 shows the synthesis of 2,2'-diacetylbiphenyl (DAB). A mixture of 2'-Iodoacetophenone (7.38 g, 30 mmol), copper powder (19.05 g, 300 mmol), CuTc (11.46 g, 60 mmol), and DMSO (60 mL) was heated up to 70° C. for 24 hours under $N_2$. Then it was cooled down to room temperature, filtered, poured into water, and extracted with EtOAc. The combined organic layer was dried over $Na_2SO_4$, filtered, and concentrated under reduced pressure. The crude product was purified by column chromatography ($SiO_2$, hexanes:EtOAc=5:1) to yield DAB as a white solid (2.39 g, 67%). $^1H$ NMR (400 MHz, Chloroform-d): δ 7.66 (m, 2H), 7.40 (m, 4H), 7.10 (m, 2H), 2.19 (s, 6H). HRMS (ESI): calcd for $C_{16}H_{14}O_2$ $[M+H]^+$ m/z=239.1067; found m/z=239.1063. FIG. 2 shows the structure of CuTc.

Figure 3:
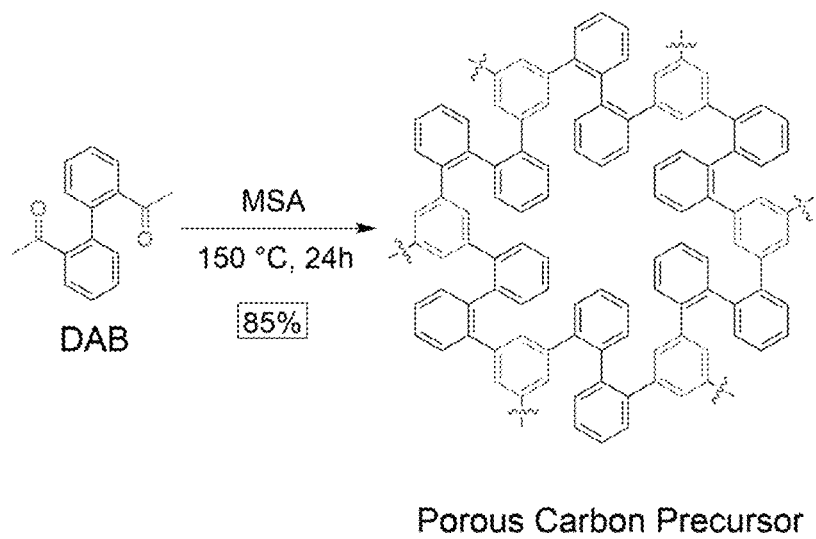
FIG. 3 illustrates the synthesis of the porous carbon precursor according to an aspect of the present disclosure.

FIG. 3 shows the synthesis of the porous carbon precursor. A 20 mL glass vial was charged with DAB (0.18 g, 0.76 mmol) and MSA (2 mL). The mixture was heated up to 150° C. for 24 hours, before it was cooled down to room temperature. The precipitate was washed with DMF and H2O, then purified by Soxhlet extraction with ethanol. The remaining solid was dried in vacuo to give a black solid (0.13 g, 85%).

Figure 4:
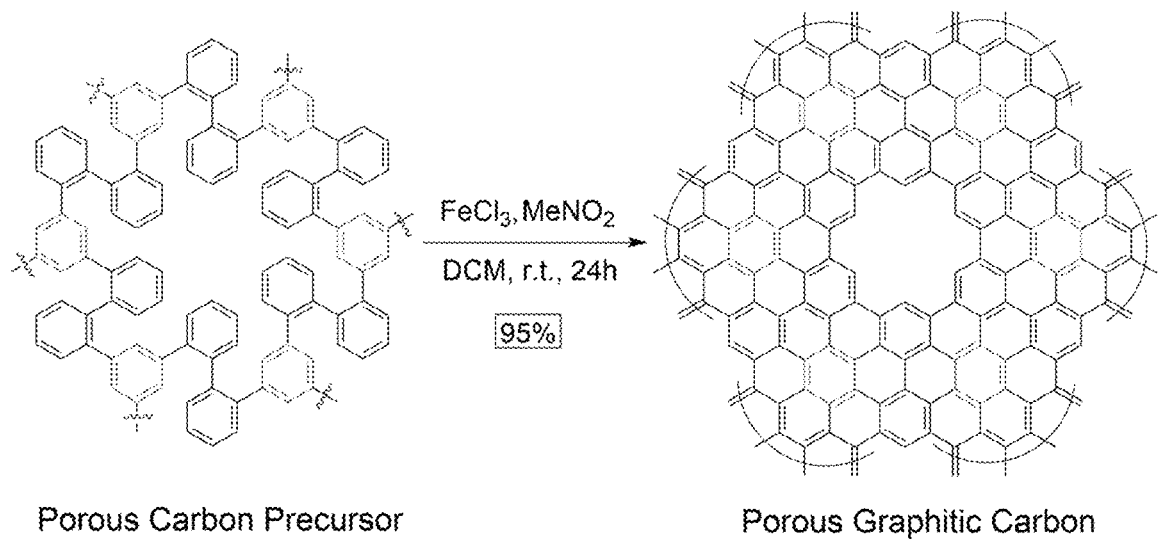
FIG. 4 illustrates the synthesis of porous graphitic carbon according to an aspect of the present disclosure.

FIG. 4 shows the synthesis of porous graphitic carbon. The porous carbon precursor (0.1 g) was suspended in DCM (15 mL), and it was bubbled with $N_2$ for 15 minutes. Then a mixture of $FeCl_3$ (0.22 g, 1.36 mmol) and $MeNO_2$ (1 mL) was added into the suspension dropwise as the catalyst. The resulting mixture was stirred for 24 hours. The precipitate was filtered, washed with DMF and $H_2O$, then purified by Soxhlet extraction with ethanol. The remaining solid was dried in vacuum to give a black solid (0.091 g, 95%).

Figure 5:
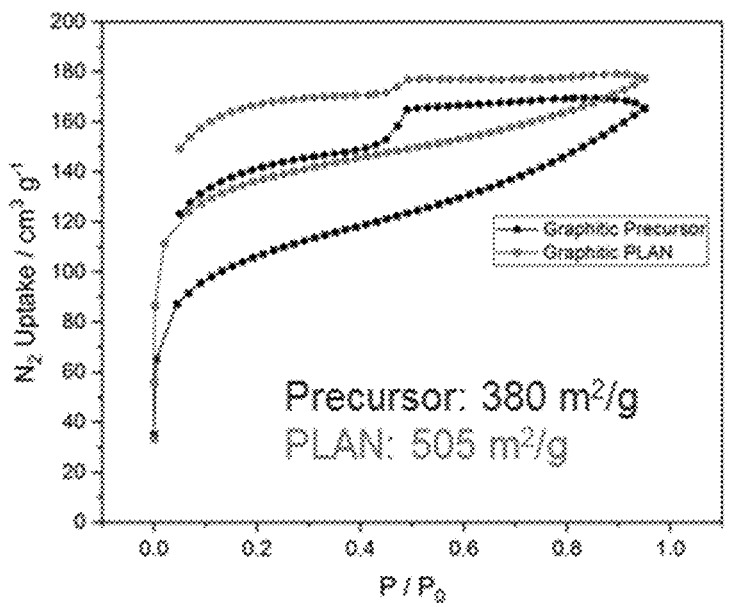
FIG. 5 shows the $N_2$ uptake in the porous carbon precursor and the porous graphitic carbon according to an aspect of the present disclosure.

FIG. 5 shows the $N_2$ uptake in the porous carbon precursor and the porous graphitic carbon. Porosities were characterized with $N_2$ sorption isotherms, which were measured at 77 K with a Micromeritics ASAP 2020 surface area and pore size analyzer. Prior to the gas adsorption measurements, the sample was degassed for 10 h at 120° C. The porous carbon precursor showed decent BET surface area of 380 $m^2$ $g^{-1}$. Next, the Scholl oxidation reaction successfully generated porous graphitic carbon with an even higher BET surface area of 505 $m^2$ $g^{-1}$.

Figure 6:
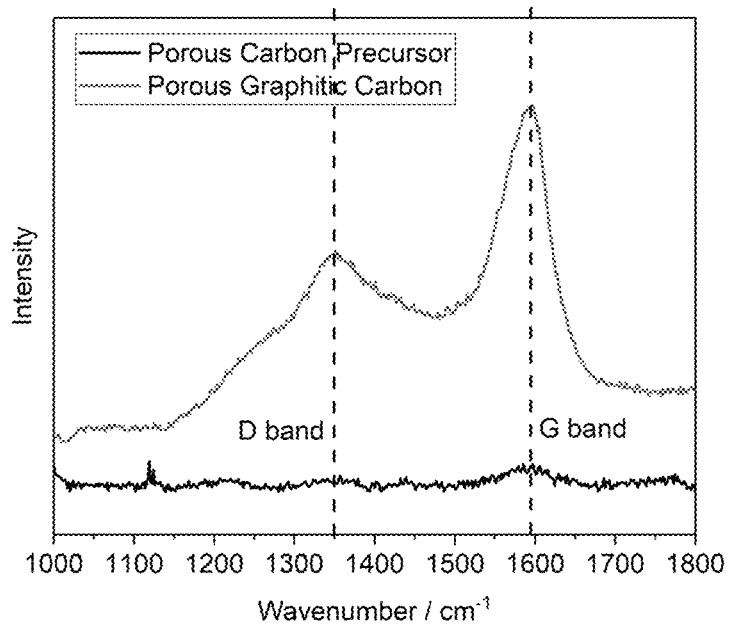
FIG. 6 is the Raman spectra for the porous carbon precursor and the porous graphitic carbon according to an aspect of the present disclosure.

FIG. 6 shows the Raman spectra for the porous carbon precursor and the porous graphitic carbon. Newly generated graphitic structure in the porous graphitic carbon after the Scholl oxidation was characterized with Raman spectra and unambiguously confirmed by emerging D band and G band compared with the porous carbon precursor.

Figure 7:
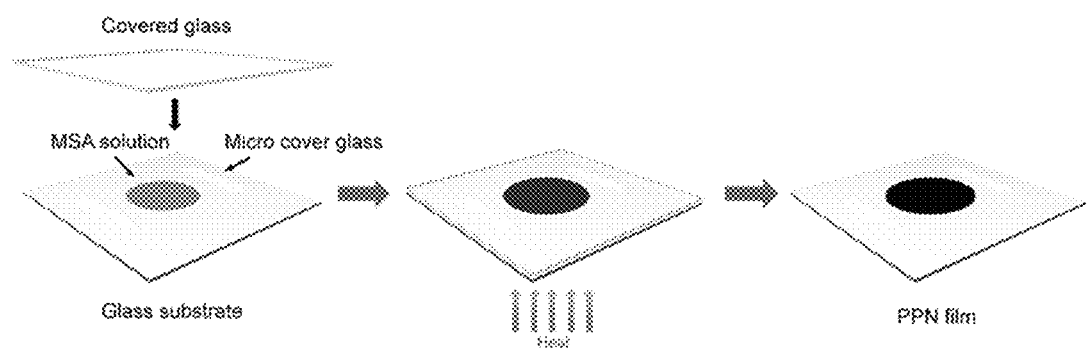
FIG. 7 illustrates the porous graphitic carbon membrane fabrication according to an aspect of the present disclosure.
Figure 8:
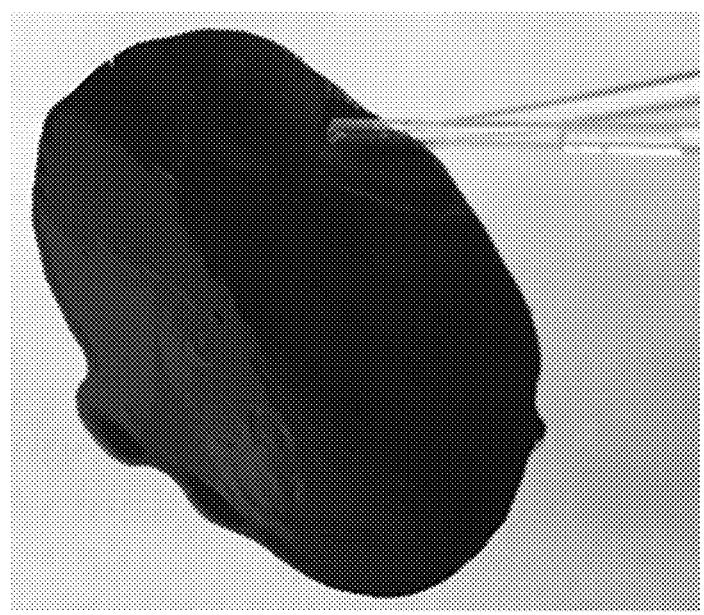
FIG. 8 shows the free standing graphitic PLAN precursor film according to an aspect of the present disclosure.

FIGS. 7-8 show the porous graphitic carbon membrane fabrication. A monomer DAB solution in MSA (0.09 g/mL) was sandwiched by two pieces of glass, which were coated with PTFE on the surface first. Two pieces of micro cover glass were placed on two sides and acted as the spacer to enable membrane with various thicknesses. Heating up this set-up at 150° C. for 24 hours generated the desired porous carbon precursor membrane (shown in the middle of FIG. 7), which was easily peeled off as a free-standing film (shown in FIG. 8).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a monomer" means one or more monomers, and thus, possibly, more than one monomer is contemplated and may be employed or used in an implementation of the described embodiments. Further, the use of a singular noun includes the plural, and the use of a plural noun includes the singular, unless the context of the usage requires otherwise.

The invention is claimed as follows:

1. A method for preparation of a carbon membrane, the method comprising:
    providing a first solution comprising a diacetyl biphenyl monomer and an alkylsulfonic acid;
    treating the first solution under such conditions that an aldol condensation reaction occurs to produce a porous polymer network;
    treating the porous polymer network under such conditions that a Scholl reaction occurs;
    synthesizing a porous carbon precursor; and
        wherein the synthesizing of the porous carbon precursor comprises:
            heating the first solution to a temperature between 100° C. and 200° C.;
            cooling the first solution; and
            extracting the porous carbon precursor;
    synthesizing a porous graphitic carbon;
        the synthesizing of the porous graphitic carbon comprises:
            providing a suspension comprising the porous carbon precursor;
            bubbling the suspension with $N_2$;
            adding to the suspension a mixture comprising $FeCl_3$ and $MeNO_2$ dropwise; and
            stirring the suspension.

2. The method of claim 1, wherein the first solution comprises a plurality of diacetyl biphenyl monomers.

3. The method of claim 1, wherein the aldol condensation reaction comprises an aldol triple condensation reaction.

4. The method of claim 1, wherein the alkylsulfonic acid comprises methanesulfonic acid (MSA).

5. The method of claim 1, wherein the porous polymer network comprises a conjugated porous polymer network.

6. The method of claim 1, wherein the diacetyl biphenyl monomer comprises 2,2'-diacetyl-1,1'-biphenyl.

7. The method of claim 1 further comprising synthesizing the diacetyl biphenyl monomer.

8. The method of claim 7, wherein the synthesizing of the diacetyl biphenyl monomer comprising
    providing a second solution comprising 2'-Iodoacetophenone, copper powder, and CuTc;
    heating the second solution; and
    cooling the second solution.

9. The method of claim 8, wherein the heating of the second solution comprises heating the second solution to a temperature below 100° C. under $N_2$.

10. The method of claim 8, wherein the heating of the second solution comprises heating the second solution to a temperature up to 70° C.

11. The method of claim 8, wherein the heating of the second solution comprises heating the second solution for about 24 hours.

12. The method of claim 8, wherein the cooling of the second solution comprises cooling the second solution to room temperature.

13. The method of claim 1 comprising providing the first solution between two pieces of glass; and heating the two pieces of glass to the temperature between 100° C. and 200° C.

14. The method of claim 13, wherein the heating of the two pieces of glass comprises heating the two pieces of glass at about 150° C. for about 24 hours.

15. A method for preparation of a carbon membrane, the method comprising:
    providing a first solution comprising a diacetyl biphenyl monomer and an alkylsulfonic acid;
    treating the first solution under such conditions that an aldol condensation reaction occurs to produce a porous polymer network;
    treating the porous polymer network under such conditions that a Scholl reaction occurs;
    synthesizing a porous carbon precursor; and
        wherein the synthesizing of the porous carbon precursor comprises:
            heating the first solution to a temperature between 100° C. and 200° C.;
            cooling the first solution; and
            extracting the porous carbon precursor;
    synthesizing a porous graphitic carbon;
        the synthesizing of the porous graphitic carbon comprises:
            providing a suspension comprising the porous carbon precursor;
            bubbling the suspension with $N_2$;
            adding to the suspension a mixture comprising $FeCl_3$ and $MeNO_2$ dropwise; and
            stirring the suspension; and
    wherein the diacetyl biphenyl monomer allows for the preparation of conductive, graphitic carbon materials.

16. The method of claim 15, wherein the heating of the first solution comprises heating the first solution to the temperature at about 150° C. for about 24 hours.

17. The method of claim 1, wherein the heating of the first solution comprises heating the first solution to the temperature at about 150° C. for about 24 hours.

* * * * *